United States Patent
Blazer et al.

(10) Patent No.: US 9,389,387 B2
(45) Date of Patent: Jul. 12, 2016

(54) OPTICAL FIBER CABLE WITH PRINT PROTECTIVE OUTER SURFACE PROFILE

(71) Applicant: Corning Optical Communications LLC, Hickory, NC (US)

(72) Inventors: Bradley Jerome Blazer, Granite Falls, NC (US); Dana Craig Bookbinder, Corning, NY (US); David Wesley Chiasson, Edmonton (CA); Andrew S. Dodd, Hickory, NC (US); Daniel Warren Hawtof, Hickory, NC (US); David Henry Smith, Hickory, NC (US); Kenneth Darrell Temple, Jr., Newton, NC (US); Randall Dwaine Tuttle, Conover, NC (US)

(73) Assignee: CORNING OPTICAL COMMUNICATIONS LLC, Hickory, NC (US)

( * ) Notice: Subject to any disclaimer, the term of this patent is extended or adjusted under 35 U.S.C. 154(b) by 0 days.

(21) Appl. No.: 14/828,764

(22) Filed: Aug. 18, 2015

(65) Prior Publication Data

US 2016/0054533 A1 Feb. 25, 2016

Related U.S. Application Data

(60) Provisional application No. 62/040,663, filed on Aug. 22, 2014.

(51) Int. Cl.
G02B 6/44 (2006.01)

(52) U.S. Cl.
CPC ............ *G02B 6/4482* (2013.01); *G02B 6/4403* (2013.01); *G02B 6/443* (2013.01)

(58) Field of Classification Search
None
See application file for complete search history.

(56) References Cited

U.S. PATENT DOCUMENTS

| 4,997,994 A * | 3/1991 | Andrews ................ B41M 5/267 174/112 |
| 5,350,885 A | 9/1994 | Falciglia et al. |
| 2009/0056852 A1 | 3/2009 | Taniguchi et al. |

(Continued)

FOREIGN PATENT DOCUMENTS

| CN | 202067591 U | 12/2011 |
| EP | 2584390 A1 | 4/2013 |

(Continued)

OTHER PUBLICATIONS

Patent Cooperation Treaty, International Search Report and Written Opinion for PCT/US2015/045466, mail date Nov. 13, 2015, 12 pages.

*Primary Examiner* — Uyen Chau N Le
*Assistant Examiner* — Chad Smith
(74) *Attorney, Agent, or Firm* — William D. Doyle

(57) ABSTRACT

An optical cable is provided. The optical cable includes a cable body having an outer surface and an inner surface defining a lumen and one or more optical transmission elements located within the lumen. The optical cable includes a groove array comprising a plurality of grooves located on the outer surface of the cable body. Each groove defines a trough having a lower surface located between peaks on either side of the trough, and the groove array includes an average groove spacing. The optical cable includes an ink layer applied to the cable body at the location of the groove array. The groove array and the ink layer are formed to limit abrasion experienced by the ink layer.

19 Claims, 7 Drawing Sheets

(56) References Cited

U.S. PATENT DOCUMENTS

2010/0101821 A1    4/2010    Agan et al.
2011/0220386 A1    9/2011    Temblador et al.

FOREIGN PATENT DOCUMENTS

WO    2005001537 A1    1/2005
WO    2011150787 A1    8/2011

* cited by examiner

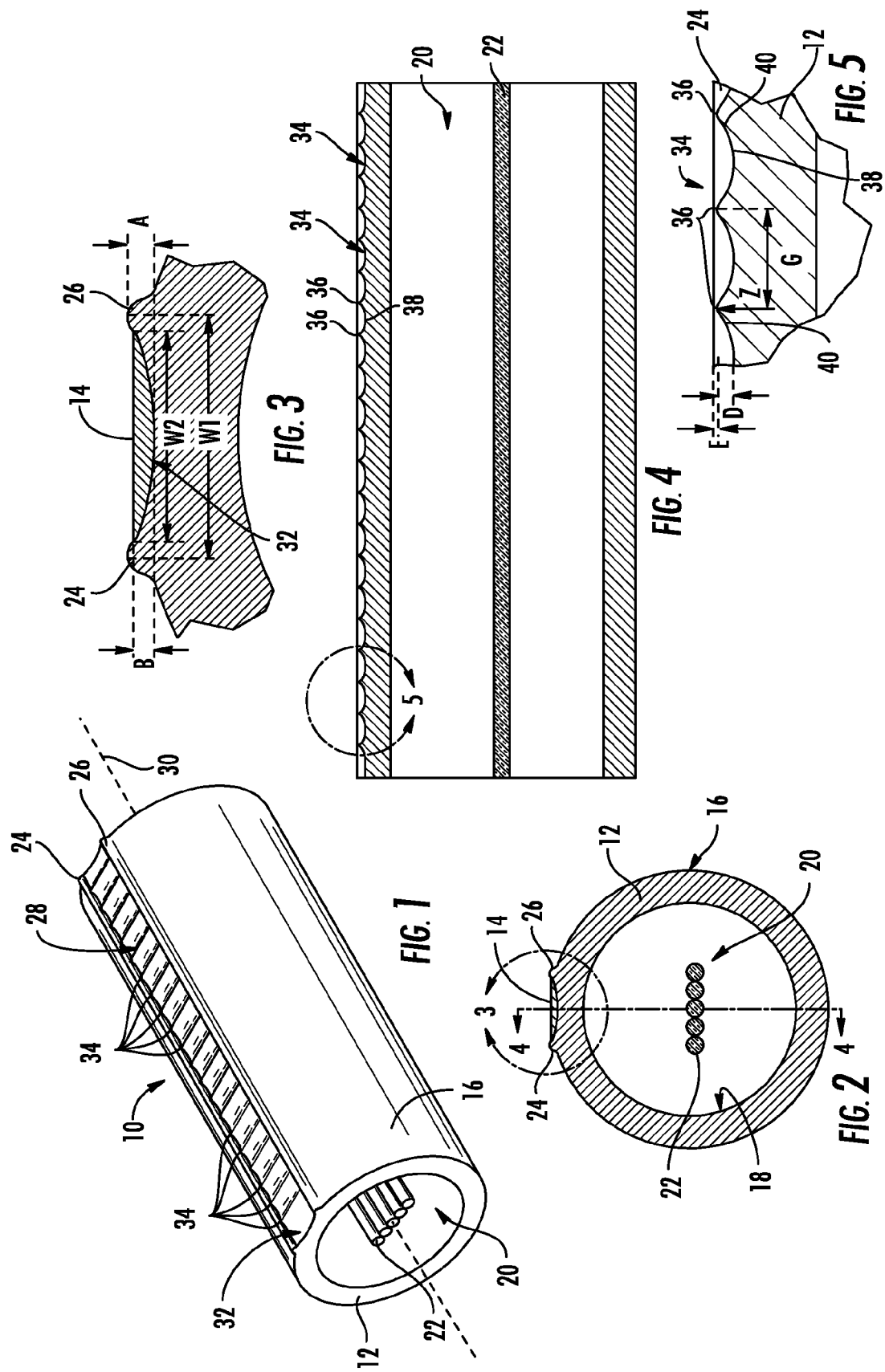

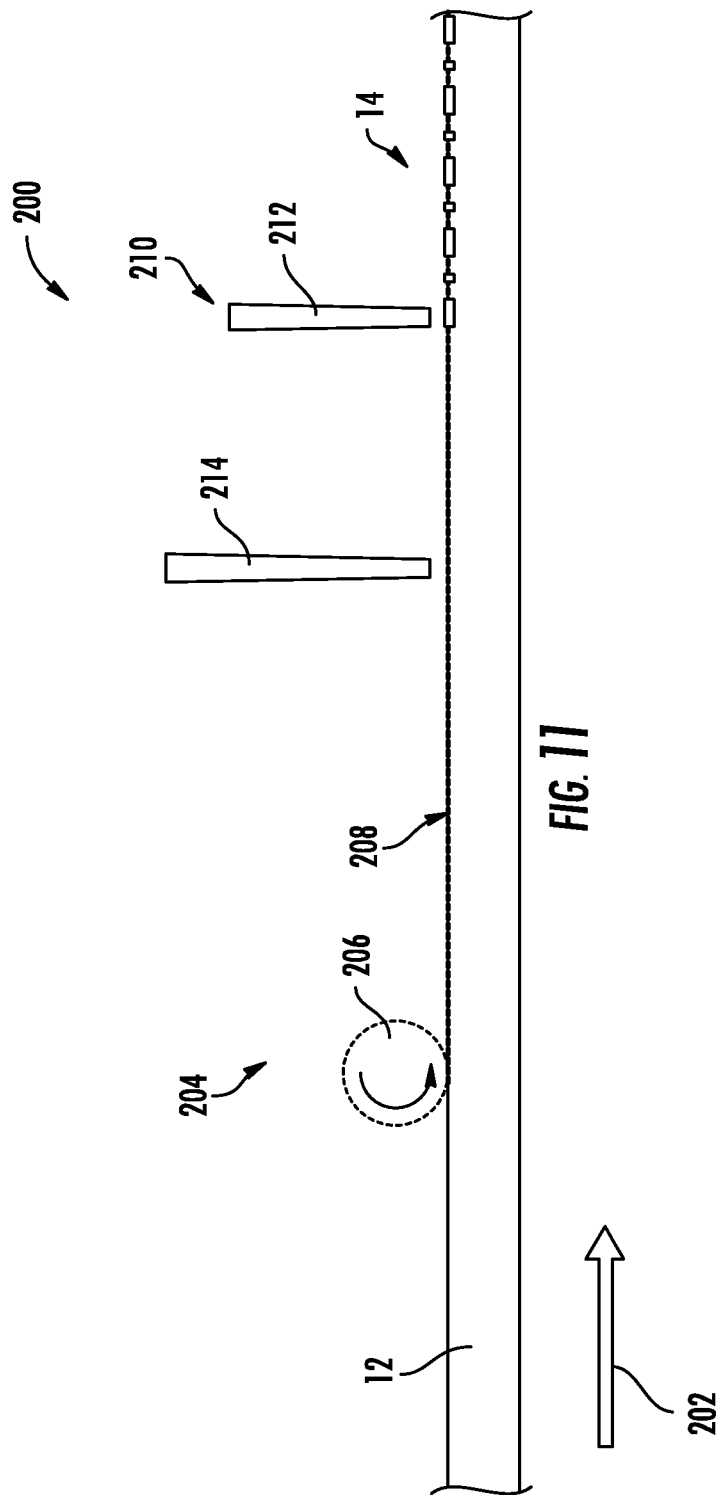

OPTICAL FIBER CABLE WITH PRINT PROTECTIVE OUTER SURFACE PROFILE

PRIORITY APPLICATION

This application claims the benefit of priority under 35 U.S.C. §119 of U.S. Provisional Application No. 62/040,663, filed on Aug. 22, 2014, the content of which is relied upon and incorporated herein by reference in its entirety.

BACKGROUND

The disclosure relates generally to optical cables and more particularly to optical communication cables including a print protective surface profile. Optical communication cables have seen increased use in a wide variety of electronics and telecommunications fields. Optical communication cables may contain or surround one or more optical communication fibers. The cable provides structure and protection for the optical fibers within the cable.

SUMMARY

One embodiment of the disclosure relates to an optical cable. The optical cable includes a cable body having an outer surface and an inner surface defining a lumen and one or more optical transmission elements located within the lumen. The optical cable includes a groove array comprising a plurality of grooves located on the outer surface of the cable body. Each groove defines a trough having a lower surface located between peaks on either side of the trough, and the groove array includes an average groove spacing. The optical cable includes an ink layer applied to the cable body at the location of the groove array, and the ink layer forms a series of characters that provide information related to the optical cable. The series of characters includes an average character width, and the average character width is greater than the average groove spacing.

An additional embodiment of the disclosure relates to an optical cable. The optical cable includes a cable body having an outer surface and an inner surface defining a lumen. The optical cable includes one or more optical transmission elements located within the lumen. The optical cable includes a plurality of substantially parallel grooves formed in the cable body. The optical cable includes an ink indicia layer applied to the cable body over the substantially parallel grooves. The ink indicia layer forms a series of alphanumeric characters. At least some of the alphanumeric characters include a substantially linear portion extending between an upper edge and a lower edge of the character, and the substantially linear portion forms an angle relative to the substantially parallel grooves of between 15 degrees and 35 degrees.

An additional embodiment of the disclosure relates to an optical cable. The optical cable includes a cable body having an outer surface and an inner surface defining a lumen. The optical cable includes one or more optical transmission elements located within the lumen. The optical cable includes a surface pattern including an alternating series of troughs and peaks formed in the outer surface of the cable body. The alternating series extends in the axial direction along the outer surface of the cable body, and each of the troughs and peaks extend in a circumferential direction around a portion of a perimeter of the cable body. The optical cable includes a series of ink dots adhered to the outer surface of the cable body such that at least portions of at least some of the ink dots are located within the troughs of the surface pattern. The ink dots form a series of characters providing information related to the optical cable. The series of characters spans between 1.1 and 3.5 grooves for each character of the series, and the series of characters are formed from a font having an italic angle between 15 degrees and 35 degrees.

Additional features and advantages will be set forth in the detailed description which follows, and in part will be readily apparent to those skilled in the art from the description or recognized by practicing the embodiments as described in the written description and claims hereof, as well as the appended drawings.

It is to be understood that both the foregoing general description and the following detailed description are merely exemplary, and are intended to provide an overview or framework to understand the nature and character of the claims.

The accompanying drawings are included to provide a further understanding and are incorporated in and constitute a part of this specification. The drawings illustrate one or more embodiment(s), and together with the description serve to explain principles and operation of the various embodiments.

BRIEF DESCRIPTION OF THE DRAWINGS

FIG. 1 is a perspective view of an optical fiber cable according to an exemplary embodiment.

FIG. 2 is a cross-sectional view of the optical fiber cable of FIG. 1 according to an exemplary embodiment.

FIG. 3 is a detailed cross-sectional view of a portion of the optical fiber cable of FIG. 1 according to an exemplary embodiment.

FIG. 4 is a longitudinal cross-sectional view of the optical fiber cable of FIG. 1 according to an exemplary embodiment.

FIG. 5 is a detailed cross-sectional view of a portion of the view shown in FIG. 4 according to an exemplary embodiment.

FIG. 11 shows a system for forming a fiber optic cable with a groove array according to another exemplary embodiment.

DETAILED DESCRIPTION

Figure 6:
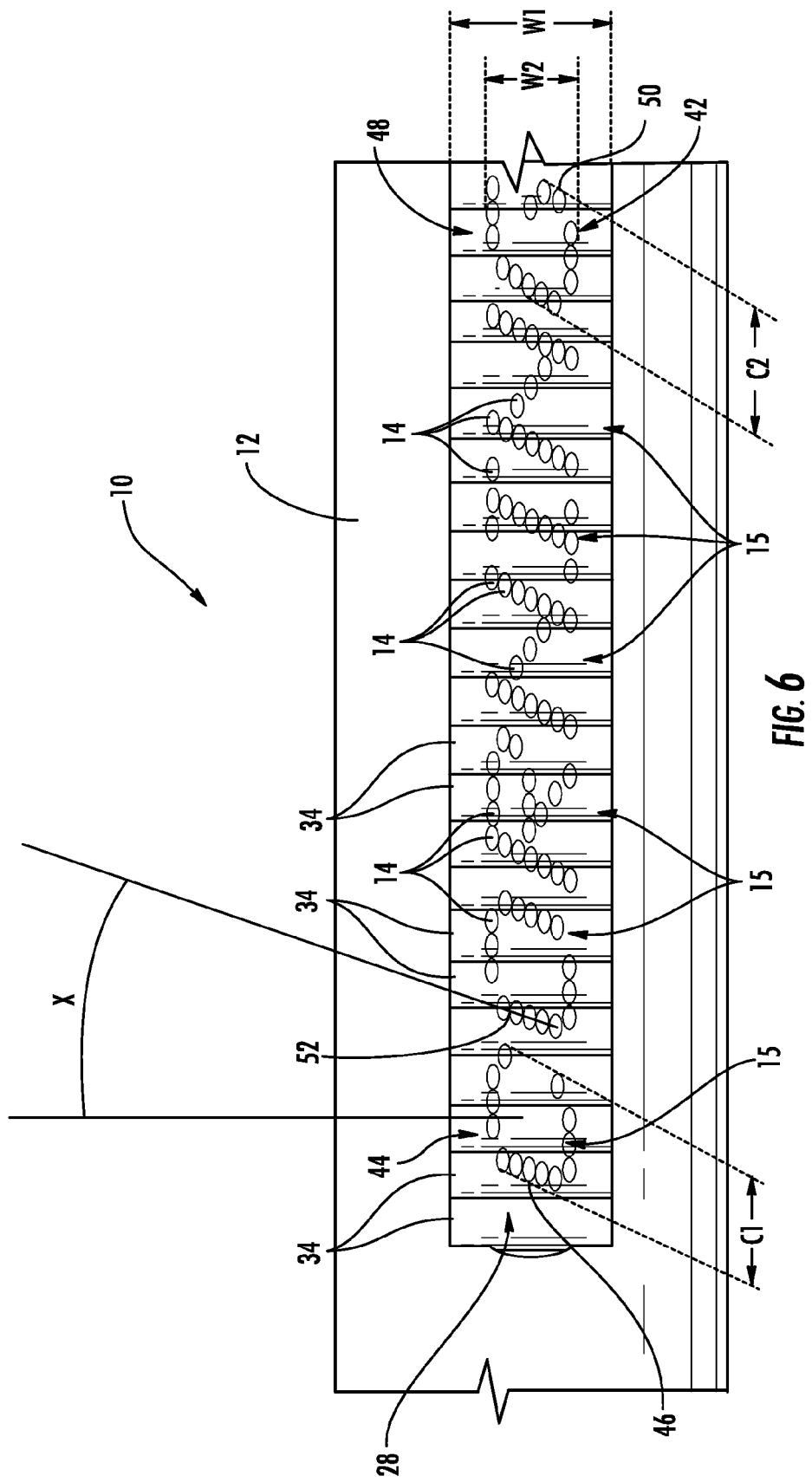
FIG. 6 is a detailed plan view of a portion of the optical fiber cable of FIG. 1 showing an ink layer located on a groove array according to an exemplary embodiment.

Referring generally to the figures, various embodiments of an optical cable are shown. In general, the cable embodiments disclosed herein include a surface-applied ink layer (e.g., an ink jet deposited ink layer) adhered to the outer surface of the body of the cable. In various exemplary embodiments, the ink layer forms a series of characters that provides information regarding the cable to which the ink layer is applied. To protect the surface-applied ink layer, the cable embodiments disclosed herein include a series of grooves or groove array formed in the outer surface of the cable body that acts to protect the ink layer. The surface-applied ink layer is positioned over the series of grooves.

In various embodiments, the spacing, shape, relative sizing and relative positioning of the grooves in relation to sizing and positioning of the characters of the ink layer act to limit contact of the ink layer with various surfaces during installation or use. For example, the spacing, shape, relative sizing and relative positioning of the grooves in relation to sizing and positioning of the characters of the ink layer are designed to increase or maximize the portions of the characters of ink layer that are adhered to the outer surface of the cable body within the grooves (e.g., below the peaks within the pattern of grooves). Thus, the recession of the ink layer within the grooves and below the outermost surfaces of the cable body adjacent the ink layer act as a buffer that limits contact of the ink layer with various surfaces during use or installation. By limiting the contact experienced by the ink layer, the profile feature acts to protect the ink layer from being damaged, abraded or worn off during the installation or use of the cable while still allowing the user to view the ink layer.

During a hot foil printing process (a typical printing process used for many fiber optic cables), the hot foil applied ink is embedded below the outer surface of the cable body due to the heating of the ink layer. In contrast to hot foil printing, a surface applied ink layer (e.g., an ink jet applied ink layer) is located on the outer surface of the cable body and thus, may be more susceptible to damage or wear during installation. The cable embodiments discussed herein include a series or array of grooves including troughs recessed below the outer surface of the cable body such that the surface applied ink layer with the troughs is located below the outermost surfaces of the cable body. Further, the series or array of grooves disclosed herein are localized features along the otherwise smooth/consistent outer surface of the cable body. Because the grooves are located generally at the location of the ink layer, the grooves also provide a tactile indicator that may assist during installation or repair by allowing the user to identify the location of the ink layer by touch which allows the user to more easily/efficiently reorient the cable to view the ink layer. This can be particularly useful when working with an installed cable in tightly packed, confined and/or poorly lit areas.

Referring to FIGS. 1-6, an optical communication cable, shown as cable 10, is shown according to an exemplary embodiment. Cable 10 includes a cable body, shown as cable jacket 12, and an ink layer, shown as a series of ink dots 14 (shown in FIG. 6). Generally, as shown in FIG. 6, ink dots 14 are deposited to form characters, shown as alphanumeric characters 15, to provide various information regarding cable 10 (e.g., brand, size, cable type, etc.) or other non-alphanumeric characters or indicia (e.g., measurement marks, ID color, etc.) In one embodiment, ink dots 14 may be formed from a white, titanium oxide based ink. In other embodiments, dye based inks of other colors (e.g., yellow, orange, red, etc.) can be used, particularly for cables in which the color of the cable jacket is a non-black color. According to various exemplary embodiments as disclosed herein, the term "ink" is intended to include different families of inks, such as UV-cured inks, solvent based inks, heat cured inks, diffusion inks, where the ink at least partially diffuses into the cable surface, others inks.

Cable jacket 12 has an outer surface 16 and an inner surface 18 that defines a channel or lumen 20. Generally, lumen 20 extends the length of cable jacket 12 between openings at opposing ends of cable 10. One or more optical transmission elements, shown as fiber optic ribbon 22, are located within lumen 20. In various embodiments, fiber optic ribbon 22 includes one or more optical fibers, and each optical fiber includes an optical core, a cladding layer surrounding the optical core and an outer protective layer (e.g., a polymer coating layer) surrounding the optical core and the cladding layer. In other embodiments, the optical transmission element may be one or more multi-core optical fibers. In these embodiments, multiple optical fibers (or multiple optical cores in the case of multi-core optical fibers) are located within the lumen 20 of cable 10. In various embodiments, as shown in FIG. 2, a gap or space may be present between the outer surface of ribbon 22 and inner surface 18 which allows for the positioning and realignment of ribbon 22 within cable 10 as cable 10 is moved and positioned during installation or in use. In various embodiments, cable jacket 12 may have a thickness between 0.5 mm and 5.0 mm.

In various embodiments, cable jacket 12 is an extruded thermoplastic material. In a specific embodiment, the material of cable jacket 12 is a medium-density polyethylene based material. In various other embodiments, cable jacket 12 may be a variety of materials used in cable manufacturing such as polyvinyl chloride (PVC), polyvinylidene difluoride (PVDF), nylon, polyester or polycarbonate and their copolymers. In addition, the material of cable jacket 12 may include small quantities of other materials or fillers that provide different properties to the material of cable jacket 12. For example, the material of cable jacket 12 may include materials that provide for coloring, UV/light blocking (e.g., carbon black), burn resistance, etc.

In general, cable 10 provides structure and protection to fiber optic ribbon 22 during and after installation (e.g., protection during handling, protection from elements, vermin, etc.). In one embodiment, cable jacket 12 is formed from a single layer of extruded polymer material (e.g., a medium-density polyethylene material), and in other embodiments, cable jacket 12 may include multiple layers of materials where the outermost layer defines outer surface 16 of cable jacket 12. Further, cable 10 may include one or more strengthening member embedded within the material of cable jacket 12. For example, cable 10 may include an elongate strengthening member (e.g., a fiber or rod) that runs the length of cable jacket 12 and that is formed from a material that is more rigid than the material of cable jacket 12. In various embodiments, the strengthening member is metal, braided steel, glass reinforced plastic, fiber glass, fiber glass yarns or other suitable material.

Cable 10 includes a profile feature that acts to protect ink dots 14. Generally, the profile feature is a shape, texture or pattern formed in outer surface 16 of cable jacket 12 that is located at the position of the ink layer. In the embodiment of FIGS. 1-6, the profile feature includes a first longitudinal buttress 24 and a second longitudinal buttress 26. In addition, a surface pattern of alternating peaks and troughs, shown as groove array 28, is located between buttresses 24 and 26. As shown in FIG. 1, groove array 28 is recessed below the outermost surfaces of buttresses 24 and 26. In various embodiments, as discussed in more detail below, groove array 28 may be formed from processes including etching, embossing, and molding processes.

As shown, buttresses 24 and 26 generally are raised ridges that extend radially outward from the generally cylindrical outer surface 16 of cable jacket 12. In the embodiment shown, buttresses 24 and 26 are substantially parallel ridges or projections that extend axially along at least a portion of the length of cable jacket 12. Further, as shown in FIG. 2, buttresses 24 and 26 and groove array 28 are located centered around the 12 o'clock position in the orientation of FIG. 2. Thus, the localized positioning of buttresses 24 and 26 and groove array 28 results in the outer perimeter and outer surface of cable jacket 12 that is asymmetrical about the longitudinal axis 30 of lumen 20 as shown in FIG. 2. As noted above, this asymmetry acts as a tactile identification feature that identifies the position of ink dots 14 along the surface of cable jacket 12.

Cable jacket 12 includes an outer surface 32 that is located between buttresses 24 and 26. As shown in FIG. 6, ink dots 14 are adhered to the outer surface 32 such that ink dots 14 are located between buttresses 24 and 26 and below the outermost surfaces of buttresses 24 and 26. As shown best in FIG. 3, outer surface 32 is primarily a concave surface, and in the embodiment shown is a continuous curved surface extending between buttresses 24 and 26. In various embodiments, outer surface 32 has a radius of curvature between 3 mm and 10 mm, and more specifically, between 4 mm and 6 mm.

As shown best in FIG. 3 and FIG. 6, in the embodiment shown, ink dots 14 form a surface deposited ink layer adhered or bonded to outer surface 32 of the grooves of groove array 28. Thus, the ink of ink dots 14 extends outward from the outer surface 32 of the grooves of groove array 28. Generally, the outermost surface of ink dots 14 is above outer surface 32 but is below the outermost surface of buttresses 24 and 26.

In one embodiment, ink dots 14 form an ink jet deposited ink layer. In such embodiments, charged ink particles are sprayed from an ink jet nozzle to form the desired indicia (e.g., alphanumeric indicia, other types of indicia), such as characters 15 shown in FIG. 6. In certain embodiments, cable jacket 12 is formed from a non-polar material (e.g., a polyethylene material) that does not readily accept bonding of the charged ink jet droplets. In such embodiments, cable jacket 12 may be polarized (e.g., oxidized) by plasma treatment to create a surface that wets/bonds with the liquid ink jet droplets. In various embodiments, ink dots 14 are formed using solvent-based pigmented inks or UV curable pigmented inks. In other embodiments, ink dots 14 are formed through other ink deposition or printing techniques such as low indentation hot foil printing. In other embodiments, the alphanumeric characters of ink dots 14 may be formed using laser activated dyes. In yet other embodiments, cable 10 may include a non-ink based indicia layer. For example, the indicia layer may be an etched or embossed indicia layer, a surface adhered label, or laser ablation of carbon black within cable jacket 12 and subsequent foaming of the material of cable jacket 12 to create the contrast to form indicia.

In various embodiments, the relative sizing of ink dots 14 and the profile feature are selected to provide sufficient protection for ink dots 14. As shown in FIG. 3, the circumferential distance between the outermost point of buttress 24 and the outermost point of buttress 26 is shown as dimension W1, and the width of ink dots 14 is shown as dimension W2. In general, W1 is selected to be large enough to allow ink dots 14 to have a sufficient width W2 such that ink dots 14 form legible characters, and W1 is also sized relative to profile depth A to provide sufficient protection to ink dots 14. In various embodiments, the length W1 is between 3 mm and 5 mm. In other embodiments, length W1 is between 105% and 150% of the W2 of ink dots 14, and more specifically length W1 is between 110% and 130% of the W2 of ink dots 14.

Further, as shown in FIG. 3, the profile feature of cable 10 has a depth A, which is the distance between the lowest point of outer surface 32 and the outermost point of buttress 24 or 26, and ink dots 14 has a thickness shown as dimension B. In various embodiments, thickness B of ink dots 14 is between 1% and 20% of depth A. In various embodiments, depth A is between 5 micrometers and 300 micrometers. In such embodiments, the thickness B of ink dots 14 is between 0.5 micrometers and 10 micrometers, specifically between 1 micrometers and 5 micrometers, and more specifically is about 3 micrometers. In other embodiments, length W1 is between 5 times and 25 times the profile depth A, and more specifically is between 10 times and 20 times the profile depth A. The thicknesses and depths discussed herein are generally the dimension of the layers measured in the radial direction for the circular cross-sectional shaped cable embodiments disclosed, but for embodiments having other cross-sectional shapes, the thicknesses discussed herein may generally be the dimension measured between inner and outer surfaces of the particular layer.

In addition, as noted above, the print protection profile of cable 10 includes a groove array 28 located on outer surface 32 between buttresses 24 and 26. Groove array 28 includes a plurality of parallel grooves 34 that are positioned at a non-parallel angle relative to longitudinal axis 30. In the embodiment shown, grooves 34 of groove array 28 are substantially perpendicular (e.g., within plus or minus 10 degrees of perpendicular) to longitudinal axis 30 and are substantially perpendicular to buttresses 24 and 26. As shown in FIGS. 4 and 5, each groove 34 includes peaks 36 located on either side of a groove trough 38. Each groove 34 includes groove sidewalls 40 that extend between groove trough 38 and peaks 36. As shown in FIG. 5, grooves 34 are shaped such that the profile of each groove 34 is a continuously curved pattern of alternating peaks 36 and troughs 38 joined by sidewalls 40. Thus, in this arrangement, sidewalls 40 and troughs 38 define substantially concave grooves 34.

Further, groove array 28 is formed from a series of substantially parallel grooves 34 (e.g., in one embodiment, substantially parallel grooves are grooves in which the angles between troughs and peaks of adjacent grooves are within plus or minus 10 degrees of each other). In one such embodiment, both the peaks 36 and troughs 38 are substantially parallel to each other. In this orientation, each groove 34 is positioned to extend in the circumferential direction around a portion of the perimeter or circumference of cable jacket 12, and each groove 34 is spaced axially from the adjacent grooves such that groove array 28 extends in the axial direction along outer surface 16 of cable jacket 12. In addition, in the embodiments shown, the circumferential dimension of each groove 34 in array 28 is substantially the same as the other grooves in the array. In various embodiments, groove array 28 is a consecutive series of grooves that extend the entire length of cable 10, and in another embodiment, cable 10 may include more than one groove array 28 separated from each other by ungrooved sections of cable jacket 12.

As shown in FIG. 6 according to an exemplary embodiment, the ink layer of cable 10 is formed from a series of ink dots 14 that are adhered to the outer surface of cable jacket 12 over groove array 28 such that various ink dots are located on the surfaces of the groove troughs 38, the groove sidewalls 40 and the outer surfaces of groove peaks 36. Ink dots 14 form multiple, separate characters, shown as alphanumeric characters 15, and, in the embodiment shown, the ink layer of cable 10, includes a series 42 of alphanumeric characters 15 that extends in the axial direction (e.g., in a direction parallel to longitudinal axis 30) along a portion of outer surface 16 of cable jacket 12.

Referring to FIG. 5 and FIG. 6, groove array 28 and alphanumeric characters 15 are sized, positioned and arranged to provide resistance to abrasion according to various embodiments discussed herein. For example, in one such embodiment, ink dots 14 that contribute to a single alphanumeric character 15 span multiple grooves 34 as shown in FIG. 6. In this embodiment, sufficient numbers of ink dots 14 are located within grooves 34 (e.g., on the outer surface of groove troughs 38 or on groove sidewalls 40) such that the alphanumeric characters remain legible even if the portions of ink dots 14 on the outermost surfaces of peaks 36 between grooves are worn off. However, in another embodiment, all or substantially all of a single character 15 is located between groove peaks 36.

In various specific embodiments, the axial dimension (e.g., the width or horizontal dimension in the orientation of FIG. 6) of characters 15 is set relative to the spacing of grooves within groove array 28 to provide abrasion resistance. In various embodiments, groove array 28 has an average groove spacing which is the average of the axial distances between each adjacent peaks 36 within groove array 28, shown as dimension G in FIG. 5, and series 42 of alphanumeric characters has an average character width which is the average of the axial distances between the front and rear lateral edges of each character 15 within series 42, shown for example as dimensions C1 and C2 in FIG. 6.

In one embodiment, the average groove spacing of groove array 28 is greater than the average character width of alphanumeric series 42. In a specific embodiment, the average character width of alphanumeric series 42 is between 1.1 and 3.5 times the average groove spacing of groove array 28, and more specifically is between 1.5 and 2.5 times the average groove spacing of groove array 28. In a specific embodiment, the average character width of alphanumeric series 42 is 2 times the average groove spacing of groove array 28. In various embodiments, characters 15 of series 42 span on average between 1.1 and 3.5 grooves per character, and more specifically between 1.5 and 2.5 grooves per character. In various embodiments, the number of grooves 34 within groove array 28 is between 1.1 and 3.5 times the number of characters 15 within series 42, and more specifically, between 1.5 and 2.5 times the number of characters 15 within series 42. In a specific embodiment, the number of grooves 34 within groove array 28 is two times the number of characters 15 within series 42.

As shown in FIG. 6, series 42 includes a leading character 44 having a leading edge 46 and a trailing character 48 with a trailing edge 50. In various embodiments, the number of grooves 34 between the leading edge 46 and trailing edge 50 is between 1.1 and 3.5 times the number of characters 15 between the leading edge 46 and trailing edge 50, and more specifically, between 1.5 and 2.5 times the number of characters 15 between the leading edge 46 and trailing edge 50. In a specific embodiment, the number of grooves 34 between the leading edge 46 and trailing edge 50 is two times the number of characters 15 between the leading edge 46 and trailing edge 50.

In various embodiments, the size and shape of characters 15 of series 42 may also be positioned relative to groove array 28 to limit or reduce abrasion experienced by the ink of characters 15. In various embodiments, characters 15 are angled relative to grooves 34 of groove array 28. Many characters and in particular, alphanumeric characters, as regularly printed include character portions that are typically positioned vertically. By forming series 42 from angled characters (e.g., italic-type characters, such as where otherwise vertical lines and curves of the characters are slanted, such as forward slanted, such as forward slanted by at least 5-degrees from vertical), the proportion and number of ink dots 14 that fall below peaks 36 within groove array 28 is increased relative to the use of non-angled characters and thus allows peaks 36 to limit abrasion for a greater proportion of ink dots 14 than if non-slanted characters where used to form series 42.

In various embodiments, a number of characters, including all of the characters shown in the exemplary embodiment of FIG. 6, include at least one substantially linear portion that extends between the upper edge and the lower edge of the character. For example, the "O" character shown in FIG. 6 includes a substantially linear leading portion 52. It should be understood that as used in this context a substantially linear portion of a character formed by ink dots 14 is a portion that would be linear if the character were printed on a flat surface. In other words, a substantially linear portion of a character formed by ink dots 14 is a portion that appears linear when viewed in a plan view such as FIG. 6, such that the effect of the curvature of the cable body and the shape of the grooves of groove array 28 is ignored.

As shown in FIG. 6, characters 15 are formed such that the substantially linear portions extending between the upper and lower edges of the character, such as leading portion 52 of the "O" character, form a non-zero angle, shown as angle X, relative to troughs 38 and/or peaks 36 of grooves 34. In various embodiments, characters 15 are formed such that angle X is greater than zero degrees and less than 90 degrees. In various embodiments, characters 15 are formed such that angle X is between 5 degrees and 45 degrees, and more specifically is between 15 degrees and 35 degrees. In specific embodiments, angle X is between 20 degrees and 30 degrees, and more specifically is 25 degrees.

In various embodiments, characters 15 are formed from a font having an italic angle and a font size. In various embodiments, the italic angle is between 5 degrees and 45 degrees, and more specifically is between 15 degrees and 35 degrees. In various embodiments, characters 15 are a font having a font size between 2 and 38, and more specifically between 4 and 12. In various embodiments, characters 15 may be formed from any suitable font type, including Times New Roman, Courier, and Arial.

Referring to FIG. 5, the shape and positioning of grooves 34 are shown in more detail. As noted above, grooves 34 include groove spacing G which is the distance between the outer most points of adjacent groove peaks 36. In various embodiments, groove spacing G is between 0.1 mm and 0.3 mm. Grooves 34 include a groove depth D which is the distance between the innermost point in groove trough 38 and the outermost point of the adjacent groove peak 36. In various embodiments, groove depth D is between 0.05 mm and 0.3 mm. In various embodiments, groove array 28 has an average groove depth that is the average of the groove depths D of the grooves of the groove array. In various embodiments, the average groove depth of groove array 28 is between 0.05 mm and 0.3 mm. As shown in FIG. 5, the outermost surfaces of grooves 34 are recessed below the outermost surface of buttresses 24 and 26, shown by the dimension E. In various embodiments, E is between 0.05 mm and 0.1 mm. In these embodiments, with grooves 34 recessed below the outermost surface of buttresses 24 and 26, buttresses 24 and 26 act to protect ink dots 14 from severe abrasion that may be caused by contact with larger structures and surfaces during the installation process, and grooves 34 may act to protect the portions of ink dots 14 located within the grooves from milder abrasion that may be caused by contact with dirt, dust, etc. during installation.

In addition, in various embodiments, peaks 36 are shaped to limit or reduce abrasion. In various embodiments, as shown in FIG. 5, peaks 36 form a convex curve that curves in the axial direction of cable 10 having a radius of curvature Z. In various embodiments, radius of curvature Z is between 0.02 mm and 0.25 mm, and more specifically is between 0.05 mm and 0.15 mm.

Figure 7:
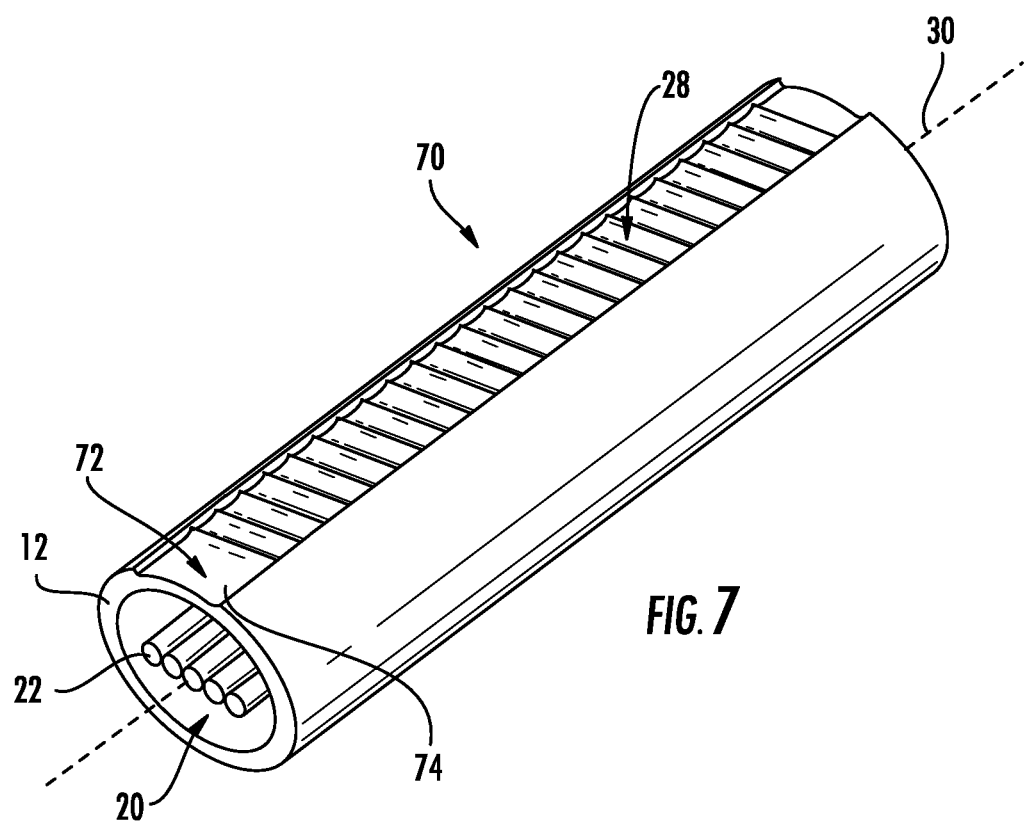
FIG. 7 is a perspective view of an optical fiber cable according to another exemplary embodiment.

Referring to FIG. 7, an optical communication cable 70 is shown according to an exemplary embodiment. Cable 70 is substantially the same as cable 10 except that cable 70 includes a profile feature that includes a recess 72. Generally, recess 72 is a depression formed in cable jacket 12 that extends axially along cable jacket 12. Generally, recess 72 is a localized depression located centered around the 12 o'clock position in the orientation of FIG. 7. Thus, the localized positioning of recess 72 results in the outer perimeter and surface of cable jacket 12 that is asymmetrical about the longitudinal axis 30 of lumen 20 as shown in FIG. 7. Recess 72 is a localized decrease in the outer diameter of the otherwise generally cylindrical outer surface 16.

Recess 72 includes an outer surface 74, and groove array 28 is formed along outer surface 74 within recess 72. Similar to the embodiment shown in FIG. 6, ink dots 14 may be adhered along the outer surface of groove array 28 to form characters, such as alphanumeric characters 15. Similar to buttresses 24 and 26, recess 72 acts to recess groove array 28 and an ink layer applied to groove array 28 below the outermost surfaces of cable jacket 12 limiting contact and abrasion of the ink layer that may otherwise occur during installation. The alphanumeric characters 15 may be in any language or alphanumeric system (e.g., English language and base-10 numbers). In some such embodiments, the alphanumeric characters 15 may provide information in a bi-lingual format and/or have some symbols used. In contemplated embodiments, at least some of the ink dots 14 are formed, connected or otherwise arranged to provide bars or blocks in a grid that may be machine-readable code (e.g., barcode, QR code, etc.) and/or scanned to provide information, such as information relating to the cable 10, as discussed herein.

Figure 8:
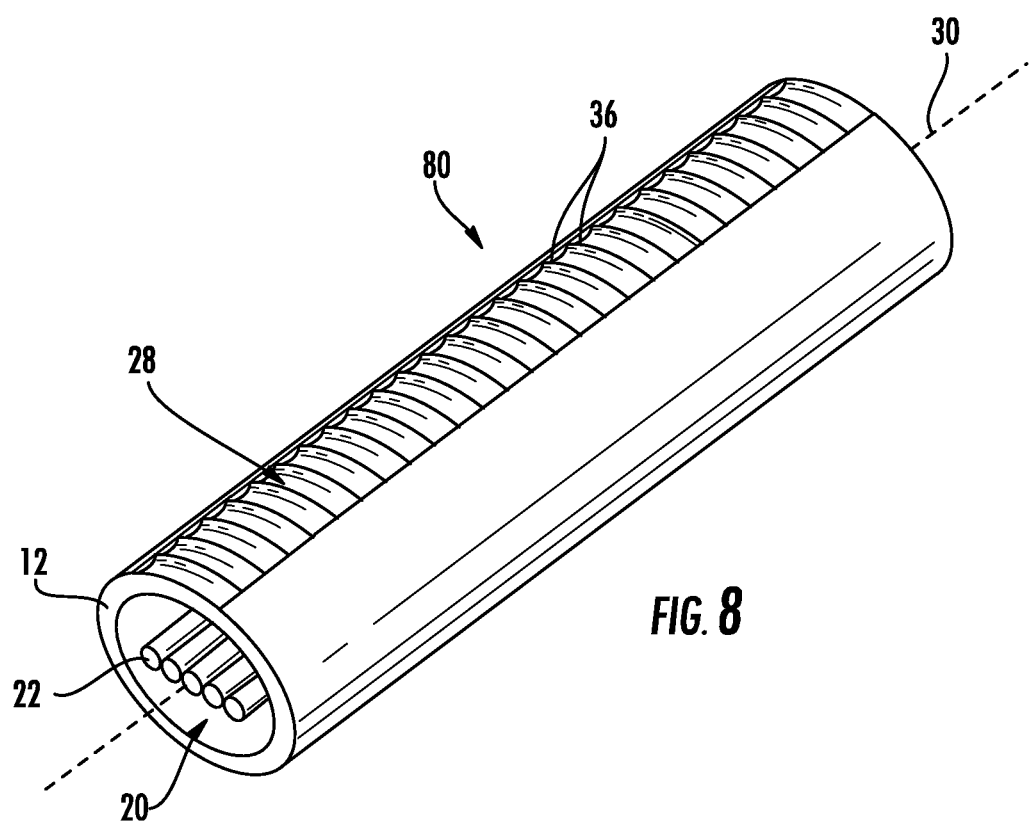
FIG. 8 is a perspective view of an optical fiber cable according to another exemplary embodiment.

Referring to FIG. 8, an optical communication cable 80 is shown according to an exemplary embodiment. Cable 80 is substantially the same as cable 10 and cable 70 except that cable 80 does not include either buttresses 24 and 26 or recess 72. In this embodiment, groove array 28 is formed directly into the outermost generally cylindrical surface 16 of cable jacket 12. In this embodiment, the outermost surfaces of peaks 36 are substantially contiguous and have the same cross-sectional radius as the other portions of outer surface 16. In this embodiment, troughs 38 of the grooves of groove array 28 are recessed below both outer surface 16 and peaks 36, and thus, acts to provide abrasion protection to ink dots 14 as discussed above. Further, one embodiment, groove array 28 is a contiguous series of alternating peaks and troughs that runs the entire length of cable jacket 12 of cable 80.

Figure 9:
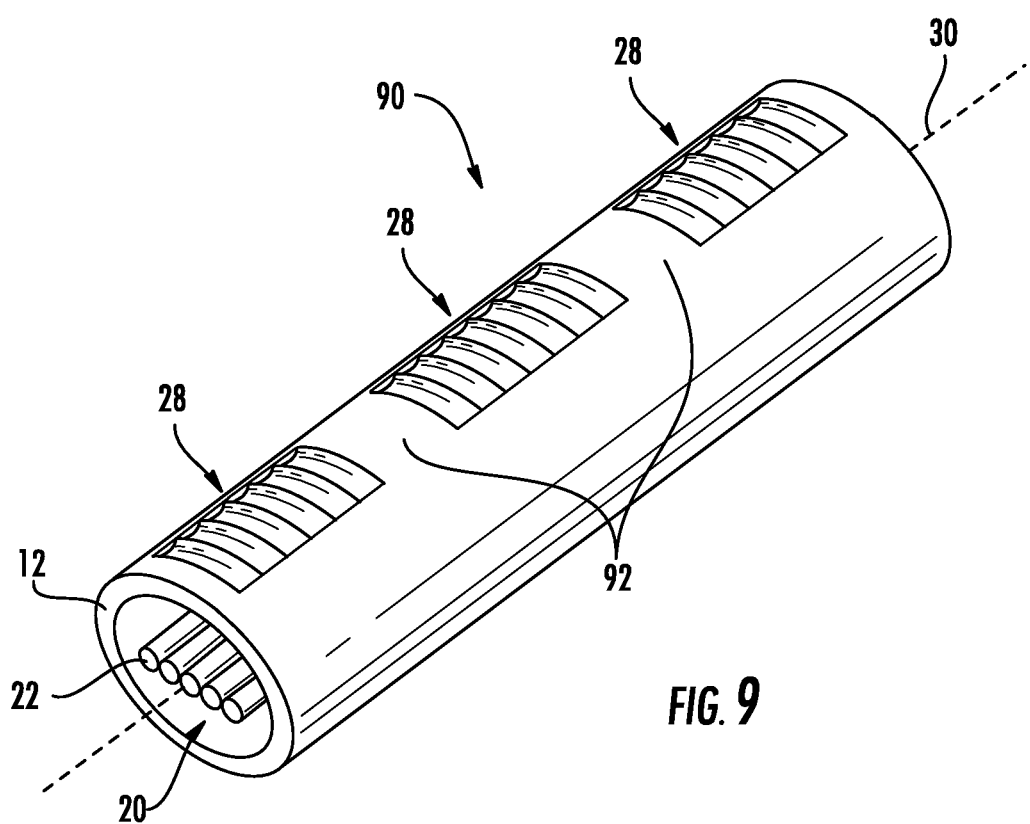
FIG. 9 is a perspective view of an optical fiber cable according to another exemplary embodiment.

Referring to FIG. 9, an optical communication cable 90 is shown according to an exemplary embodiment. Cable 90 is substantially the same as cable 80 except that the groove array of cable 90 does not run the entire length of cable jacket 12. As shown, cable 90 includes a plurality of groove arrays 28 that each only extend axially a portion of the length of cable jacket 12. In this embodiment, cable 90 includes ungrooved outer surface portions 92 located between each groove array 28.

Figure 10:
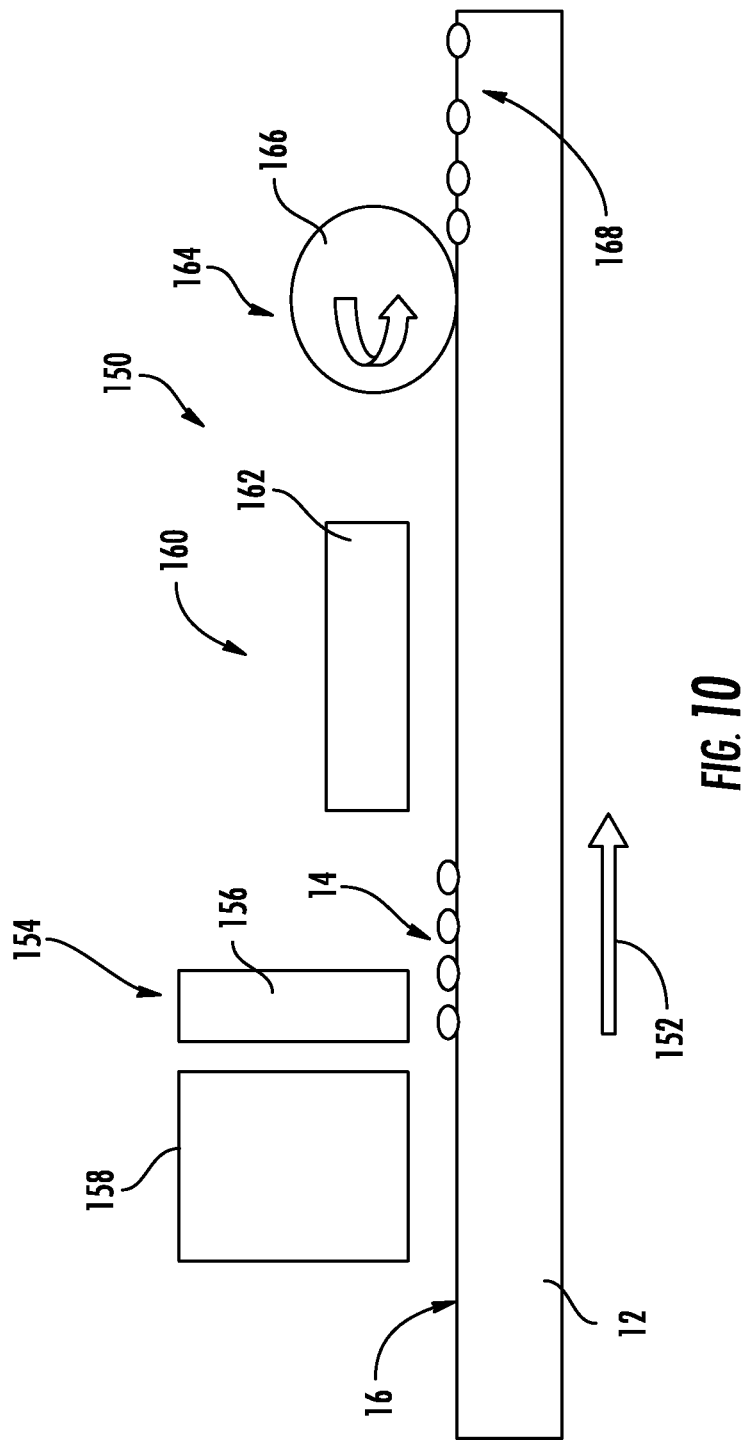
FIG. 10 shows a system for forming a fiber optic cable with a groove array according to an exemplary embodiment.

Referring to FIG. 10, a system 150 for forming a fiber optic cable with a groove array and related method is shown according to an exemplary embodiment. Generally, system 150 is configured to apply an ink layer onto an extruded cable body and then to form the groove array over the deposited ink layer.

First, a cable body is extruded over the optical fibers to create a cable, such as cable 10 discussed above. Following extrusion, the extruded cable body, such as cable jacket 12, traverses system 150 in the direction shown by arrow 152. At stage 154, cable jacket 12 passes through an ink applicator, shown as ink jet printer head 156. Ink jet printer head 156 deposits ink dots 14 onto outer surface 16 of cable jacket 12. In one embodiment, a pretreatment device 158 may be used to modify the material of cable jacket 12 to better adhere ink jet deposited ink dots 14. In one embodiment, pretreatment device 158 may be a plasma treatment device that oxidizes/ polarizes outer surface 16 of cable jacket 12 to create a surface that the ink jet droplets from ink jet printer head 156 wet/ adhere to. At stage 160, cable jacket 12 is heated by heating device 162. Heating device 162 softens the material of cable jacket 12 to facilitate formation of a groove array at stage 164.

At stage 164, an embossing device 166 engages cable jacket 12 at the position of the deposited ink dots 14. Embossing device 166 mechanically deforms cable jacket 12 as embossing device 166 engages the heated cable jacket. In various embodiments, embossing device 166 includes a surface with a profile complimentary to the groove array to be formed in cable jacket 12, and as the profile of embossing device 166 engages cable jacket 12, embossing device 166 imprints cable jacket 12 with the desired groove array. As shown at stage 168, because embossing device 166 engages cable jacket 12 after deposition of ink dots 14, embossing device 166 acts to push ink dots 14 into the groove array such that ink dots 14 are recessed at least partially below the outermost surface of cable jacket 12.

In one embodiment, embossing device 166 may be a roller wheel that rotates as cable jacket 12 moves past station 164. In one embodiment, embossing device 166 may have a heated outer surface to further assist in the formation of the groove array in the surface of cable jacket 12. Embossing device 166 may be shaped and configured to produce any of the groove arrays discussed herein.

Referring to FIG. 11, a system 200 for forming a fiber optic cable with a groove array and related method is shown according to an exemplary embodiment. Generally, system 200 is configured to form the groove array prior to deposition of the ink layer, then to deposit the ink layer onto the groove array. First, a cable body is extruded over the optical fibers to create a cable, such as cable 10, discussed above. Following extrusion, the extruded cable body, such as cable jacket 12, traverses system 200 in the direction shown by arrow 202. At stage 204, an embossing device 206 engages cable jacket 12 to form an asymmetrical groove array 208 in outer surface 16 of cable jacket 12. Embossing device 206 mechanically deforms cable body 12 as embossing device 206 engages the cable jacket. In various embodiments, embossing device 206 includes a surface with a profile complimentary to the groove array to be formed in cable jacket 12, and as the profile of embossing device 206 engages cable jacket 12, embossing device 206 imprints cable jacket 12 with the desired groove array. In one embodiment, embossing device 206 is a heated embossing wheel that rotates to engage outer surface 16 of cable jacket 12, and this contact in turn deforms the material of cable jacket 12 forming the desired groove array. In another embodiment, embossing device 206 may mechanically deform the surface of the cable body by removing material (e.g., scraping or etching) to form the print protection profile.

At stage 210, cable jacket 12 passes through an ink applicator, shown as ink jet printer head 212. Ink jet printer head 212 deposits ink dots 14 onto outer surface 16 of cable jacket 12 at the position of groove array 208. In one embodiment, a pretreatment device 214 may be used to modify the material of cable jacket 12 to better wet/adhere ink jet deposited ink dots 14 prior to ink dot deposition. In one embodiment, pretreatment device 214 may be a plasma treatment device that oxidizes/polarizes surface 16 of cable jacket 12 to create a surface that the charged ink jet droplets from ink jet printer head 212 adhere to.

While the specific cable embodiments discussed herein and shown in the figures relate primarily to cables that have a substantially circular cross-sectional shape defining substantially cylindrical internal lumens, in other embodiments, the cables discussed herein may have any number of cross-section shapes. For example, in various embodiments, cable jacket 12 may have a square, rectangular, triangular or other polygonal cross-sectional shape. In such embodiments, the passage or lumen of the cable may be the same shape or different shape than the shape of cable jacket 12. In some embodiments, cable jacket 12 may define more than channels or passages. In such embodiments, the multiple channels may be of the same size and shape as each other or may each have different sizes or shapes.

The optical fibers discussed herein may be flexible, transparent optical fibers made of glass or plastic. The fibers may function as a waveguide to transmit light between the two ends of the optical fiber. Optical fibers may include a transparent core surrounded by a transparent cladding material with a lower index of refraction. Light may be kept in the core by total internal reflection. Glass optical fibers may comprise silica, but some other materials such as fluorozirconate, fluoroaluminate, and chalcogenide glasses, as well as crystalline materials, such as sapphire, may be used. The light may be guided down the core of the optical fibers by an optical cladding with a lower refractive index that traps light in the core through total internal reflection. The cladding may be coated by a buffer and/or another coating(s) that protects it from moisture and/or physical damage. These coatings may be UV-cured urethane acrylate composite materials applied to the outside of the optical fiber during the drawing process. The coatings may protect the strands of glass fiber.

In contemplated embodiments, the surface of the groove array may be roughened, such as with a texturing device, such as a brass brush, a sander drum (e.g., using size 40 grit), a wire brush or other devices. The process that roughens the surface may form a recess as disclosed above. On a micro-scale, the roughened surface is scored with grooves that have local troughs and peaks, as disclosed above, where rubbing contact may not remove ink located in the grooves of the roughened surface.

In contemplated embodiments, additional processes may be used in combination with the surface profile to improve bonding of the ink to the surface of the cable body. In some such embodiments, the surface of the cable body may be treated with plasma or flame to increase surface activation, thereby at least partially mitigating poor bonding qualities of jacket materials disclosed above, such as non-polar materials, such as polyethylene. In other such embodiments, bonding additives (e.g., maleic anhydride copolymer, ethylene acrylic acid copolymer, etc.) may be compounded into the jacket or applied to the surface thereof (e.g., tie layer) prior to application of the ink layer.

Accordingly, any of the surface profile geometries disclosed herein may be arranged in non-repeating and/or non-periodic patterns within a profile feature localized to a particular ink layer. Similarly discrete surface profile geometries along the length of a particular optical cable may differ from one another in terms of the specific geometry of the respective profile feature. In some such embodiments, an ink layer in one part of the optical cable may have a groove array similar to that shown in FIG. 1, while an ink layer in another part of the same cable may have a groove array similar to that of FIG. 7, and yet another ink layer in a third part of the optical cable may have a profile feature similar to that shown in FIG. 8.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that any particular order be inferred.

It will be apparent to those skilled in the art that various modifications and variations can be made without departing from the spirit or scope of the disclosed embodiments. Since modifications, combinations, sub-combinations and variations of the disclosed embodiments incorporating the spirit and substance of the embodiments may occur to persons skilled in the art, the disclosed embodiments should be construed to include everything within the scope of the appended claims and their equivalents. As will be understood by those of ordinary skill in the art, features and attributes associated with embodiments shown in one of the Figures or described in the text relating to one of the embodiments may well be applied to other embodiments shown in another of the Figures and/or described elsewhere in the text.

What is claimed is:

1. An optical cable, comprising:
    a cable body having an outer surface and an inner surface defining a lumen;
    one or more optical transmission elements located within the lumen;
    a groove array comprising a plurality of grooves located on the outer surface of the cable body, wherein each groove defines a trough having a lower surface located between peaks on either side of the trough, wherein the groove array includes an average groove spacing; and
    an ink layer applied to the cable body at the location of the groove array, wherein the ink layer forms a series of characters that provide information related to the optical cable, wherein the series of characters includes an average character width;
    wherein the average character width is greater than the average groove spacing; and
    wherein the troughs of each groove of the groove array are substantially parallel to each other, wherein at least a subset of characters of the series of characters of the ink layer are alphanumeric characters that each include a substantially linear portion extending between upper linear portion forms an angle relative to the peaks of the grooves of the groove array of between 5 degrees and 45 degrees.

2. The optical cable of claim 1 wherein the average character width is between 1.5 and 2.5 times the average groove spacing.

3. The optical cable of claim 2 wherein the ink layer is formed from a series of ink dots that are adhered to the outer surface of the cable body over the groove array such that various ink dots are located at least on the surfaces of the troughs of the grooves of the groove array.

4. The optical cable of claim 3 wherein the grooves of the groove array extend in a circumferential direction a portion of the distance around the cable body, wherein the groove array extends axially along at least a portion of a length of the cable body.

5. The optical cable of claim 4 wherein the plurality of grooves of the groove array are substantially parallel to each other, wherein spacing between adjacent troughs within the groove array is substantially constant along a length of the groove array.

6. The optical cable of claim 4 further comprising an additional groove array comprising a plurality of grooves located on the outer surface of the cable body, wherein the outer surface of the cable body includes an ungrooved portion located axially between the groove array and the additional groove array.

7. The optical cable of claim 1 wherein the grooves of the groove array extend in a circumferential direction and are substantially perpendicular to a longitudinal axis of the cable body, wherein the series of characters of the ink layer extend axially along the cable body, wherein at least a subset of characters of the series of characters of the ink layer are formed from an italic font having an italic angle between 15 degrees and 35 degrees.

8. The optical cable of claim 7 wherein the average groove spacing is between 0.1 mm and 0.3 mm, wherein the groove array includes an average groove depth, wherein the average groove depth is between 0.05 mm and 0.3 mm, wherein each groove includes sidewalls extending between the trough and the peaks on either side of the trough, wherein the sidewalls are concave curved surfaces.

9. The optical cable of claim 1 wherein at least two peaks of the groove array include an outer surface that is curved in an axial direction of the cable body, the curve in the axial direction having a radius of curvature between 0.05 mm and 0.15 mm.

10. An optical cable, comprising:
  a cable body having an outer surface and an inner surface defining a lumen;
  one or more optical transmission elements located within the lumen;
  a plurality of substantially parallel grooves formed in the cable body; and
  an ink indicia layer applied to the cable body over the substantially parallel grooves, wherein the ink indicia layer forms at least one of a series of alphanumeric characters and a machine-readable code;
  wherein at least some of the alphanumeric characters include a substantially linear portion extending between an upper edge and a lower edge of the character, wherein the substantially linear portion forms an angle relative to the substantially parallel grooves of between 15 degrees and 35 degrees.

11. The optical cable of claim 10 wherein the ink indicia layer forms the series of alphanumeric characters, wherein the substantially parallel grooves extend in a circumferential direction and each groove is spaced in an axial direction from an adjacent parallel groove, wherein the alphanumeric characters of the series of alphanumeric characters are formed from an italic font having an italic angle between 15 degrees and 35 degrees.

12. The optical cable of claim 11 wherein the series of alphanumeric characters spans on average between 1.5 and 2.5 grooves per character.

13. The optical cable of claim 11 wherein each of the substantially parallel grooves includes a trough and a peak adjacent the trough, wherein spacing in the axial direction between peaks of adjacent grooves is between 0.1 mm and 0.3 mm.

14. The optical cable of claim 10 wherein the ink indicia layer is formed from a series of ink dots that are adhered to the outer surface of the cable body such that at least portions of at least some of the ink dots are located within the substantially parallel grooves.

15. The optical cable of claim 10 wherein the substantially parallel grooves extend in a circumferential direction a portion of the distance around the cable body, wherein the circumferential dimension of each of the substantially parallel grooves is substantially the same as the circumferential dimension of each of the other substantially parallel grooves.

16. The optical cable of claim 10 further comprising a curved surface curving in the axial direction and located between each of the substantially parallel grooves, the curved surface having a radius of curvature in the axial direction between 0.05 mm and 0.15 mm.

17. An optical cable, comprising:
  a cable body having an outer surface and an inner surface defining a lumen;
  one or more optical transmission elements located within the lumen;
  a surface pattern including an alternating series of troughs and peaks formed in the outer surface of the cable body, the alternating series extending in an axial direction along the outer surface of the cable body, and each of the troughs and peaks extending in a circumferential direction around a portion of a perimeter of the cable body;
  a series of ink dots adhered to the outer surface of the cable body such that at least portions of at least some of the ink dots are located within the troughs of the surface pattern, wherein the ink dots form a series of characters providing information related to the optical cable; and
  wherein the series of characters spans between 1.1 and 3.5 grooves for each character of the series;
  wherein the series of characters are formed from a font having an italic angle between 15 degrees and 35 degrees.

18. The optical cable of claim 17 wherein the troughs and the peaks of the surface pattern are substantially perpendicular to a longitudinal axis of the cable body.

19. The optical cable of claim 18 wherein the peaks of the surface pattern include an outer surface that is curved in the axial direction of the cable body, the curve in the axial direction having a radius of curvature between 0.05 mm and 0.15 mm.

* * * * *